(12) United States Patent
Takatsu et al.

(10) Patent No.: US 9,140,841 B2
(45) Date of Patent: Sep. 22, 2015

(54) ELECTRONIC DEVICE AND ILLUMINATION DEVICE

(71) Applicant: KABUSHIKI KAISHA TOSHIBA, Minato-ku, Tokyo (JP)

(72) Inventors: Tomoyasu Takatsu, Fukaya (JP); Tatsuro Imura, Ome (JP)

(73) Assignee: Kabushiki Kaisha Toshiba, Tokyo (JP)

(*) Notice: Subject to any disclaimer, the term of this patent is extended or adjusted under 35 U.S.C. 154(b) by 197 days.

(21) Appl. No.: 14/015,096

(22) Filed: Aug. 30, 2013

(65) Prior Publication Data

US 2014/0104879 A1 Apr. 17, 2014

(30) Foreign Application Priority Data

Oct. 12, 2012 (JP) .................................. 2012-227170

(51) Int. Cl.
*F21V 8/00* (2006.01)

(52) U.S. Cl.
CPC ............ *G02B 6/0011* (2013.01); *G02B 6/0045* (2013.01)

(58) Field of Classification Search
CPC .............................. G02B 6/0011; G02B 6/0045
See application file for complete search history.

(56) References Cited

U.S. PATENT DOCUMENTS

| 5,676,456 A | * | 10/1997 | Sharp | ............................ 362/318 |
| 2010/0053063 A1 | | 3/2010 | Ishii | |
| 2012/0038689 A1 | | 2/2012 | Ishii | |

FOREIGN PATENT DOCUMENTS

| JP | 2003-297108 A | 10/2003 |
| JP | 2008-12924 A | 6/2008 |
| JP | 2008-134438 A | 6/2008 |
| JP | 4352093 B1 | 7/2009 |

* cited by examiner

*Primary Examiner* — Thomas M Sember
(74) *Attorney, Agent, or Firm* — Knobbe, Martens, Olson & Bear LLP

(57) ABSTRACT

According to one embodiment, an electronic device including a display panel, a casing including an opening, a plate-like light guiding member having a part thereof located in the opening, a masking member overlapping with a part of the light guiding member, a projection projecting from the light guiding member around the masking member, a light source provided in the casing to supply light to the light guiding member and emit the light to the outside of the projection, and a power supply unit configured to be switched between a first mode and a second mode.

7 Claims, 4 Drawing Sheets

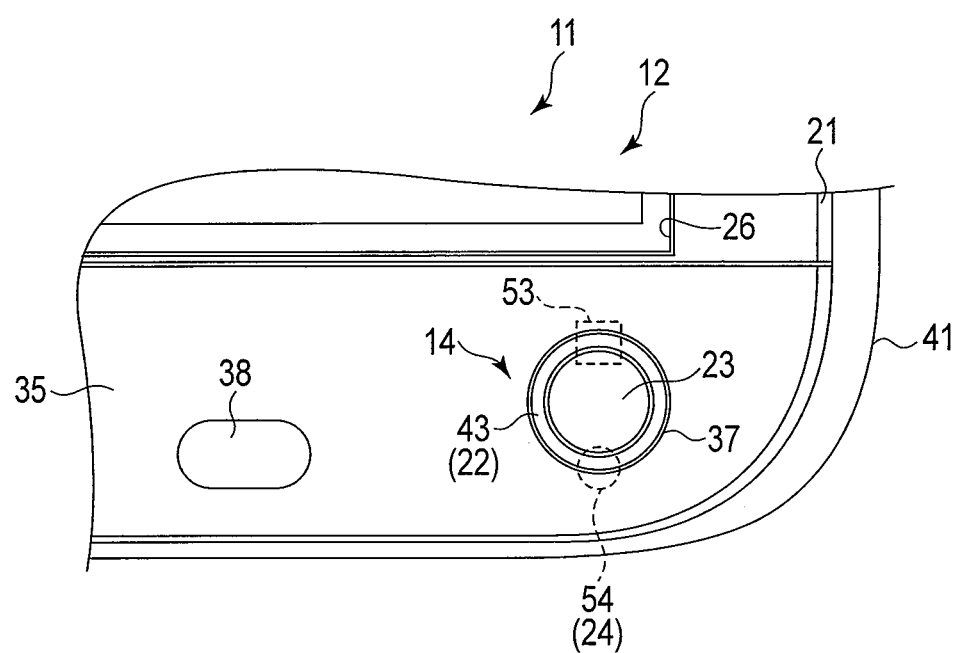
F I G. 2

ELECTRONIC DEVICE AND ILLUMINATION DEVICE

CROSS-REFERENCE TO RELATED APPLICATIONS

This application is based upon and claims the benefit of priority from Japanese Patent Application No. 2012-227170, filed Oct. 12, 2012, the entire contents of which are incorporated herein by reference.

FIELD

Embodiments described herein relate generally to a video display device and an electronic device having a display screen, and an illumination device for use in them.

BACKGROUND

A ring-shaped illumination device capable of emitting light of a ring shape having a uniform luminance is already disclosed.

The illuminating portions of video display devices may well draw the attraction of users and affect the visual quality of the devices. Accordingly, there is a demand for improving these portions.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 2 is an exemplary enlarged perspective view illustrating a light guiding member and its peripheral structure incorporated in the video display device of FIG. 1;

DETAILED DESCRIPTION

Various embodiments will be described hereinafter with reference to the accompanying drawings.

In general, according to one embodiment, an electronic device including a display panel, a casing including an opening, a plate-like light guiding member having a part thereof located in the opening, a masking member overlapping with a part of the light guiding member, a projection projecting from the light guiding member around the masking member, a light source provided in the casing to supply light to the light guiding member and emit the light to the outside of the projection, and a power supply unit configured to be switched between a first mode and a second mode.

Figure 1:
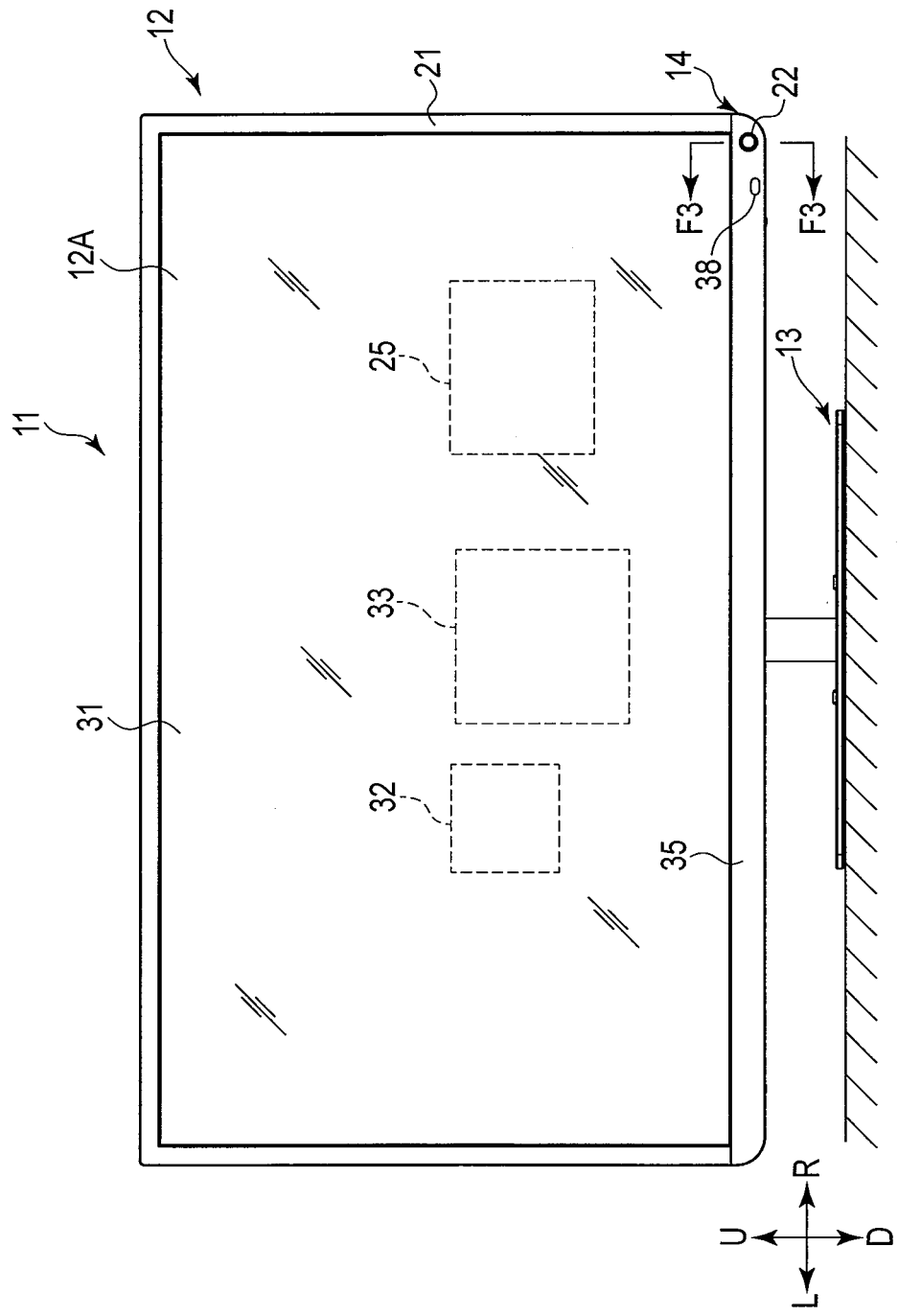
FIG. 1 is an exemplary front view illustrating a video display device as an example of an electronic device according to an embodiment.

Referring to FIGS. 1 to 5, a video display device according to an embodiment will be described. As shown in FIG. 1, a video display device 11 (TV set) according to the embodiment is an example of an electronic device and has a rectangular shape. In the embodiment described below, the direction toward the user is defined as forward direction F, the direction away from the user is defined as rearward direction B, the left direction is defined as direction L, and the right direction is defined as direction R. Further, the upward direction is defined as direction U, and the downward direction is defined as direction D.

As shown in FIG. 1, the video display device 11 comprises a display unit 12 with a display screen 12A, and a support 13 (a leg portion or stand) supporting the display unit 12. An illumination unit 14 is provided as a part of the display unit 12. The illumination unit 14 comprises a casing 21, a light guiding member 22, a second masking member 23, a light source 24, a power supply circuit board 25, etc., which will be described later (see FIGS. 2 and 3).

Figure 3:
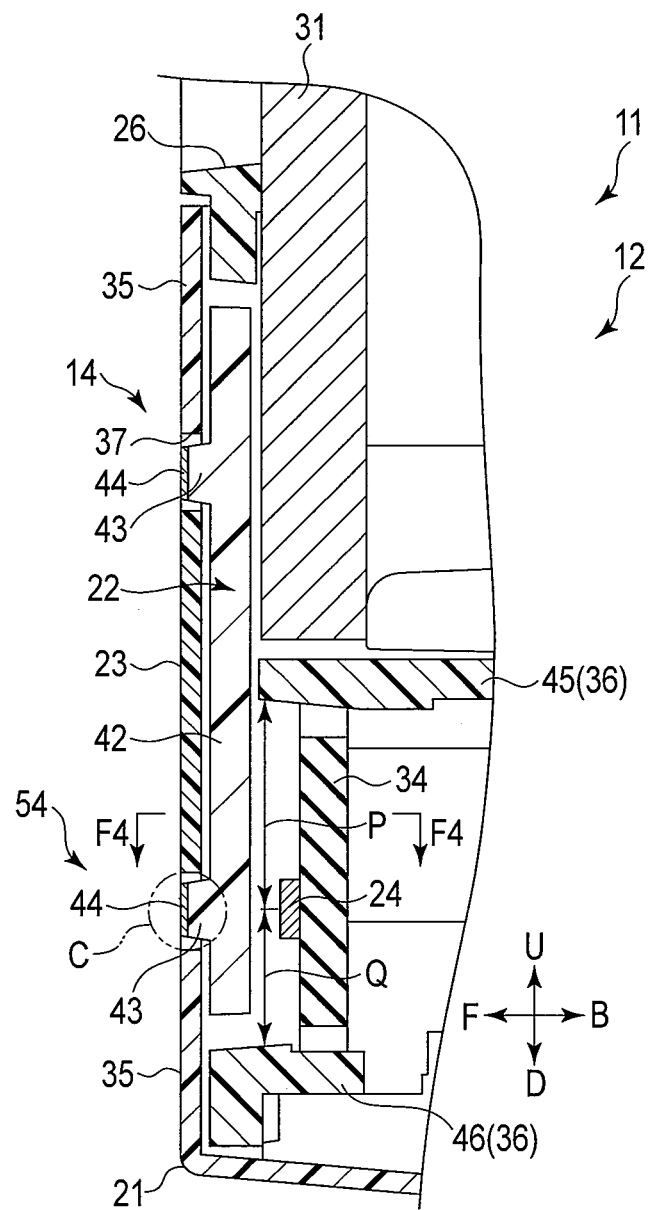
FIG. 3 is an exemplary cross sectional taking along line F3-F3 of FIG. 1.

As shown in FIGS. 1 and 3, the display unit 12 comprises a planar display panel 31 providing the display screen 12A, a tuner board 32, a system board 33 for totally controlling the components of the video display device 11, a power supply circuit board 25 (power supply unit), a light source plate 34 (plate) for mounting a light source thereon, a light source 24 mounted on the light source plate 34, and a casing 21 (frame) enclosing these elements. The display panel 31 is formed of, for example, an integrated liquid crystal panel module including a liquid crystal cell and a backlight that are formed as one body. Alternatively, the display panel may have a structure in which the liquid crystal cell, the backlight, a diffusion sheet, etc., are separate from each other. The display panel 31 may be another type of display panel, such as a plasma display panel, an organic EL, a plastic display panel and a sheet display panel.

As shown in FIGS. 1 to 3, the casing 21 comprises a first frame-shaped masking member 35 (front cover) covering a front portion of the display panel 31, a support member 36 supporting and reinforcing the first masking member 35, an opening 37 provided near a corner of the first masking member 35, light-receiving lens 38 for a remote control, and a back cover 41 covering the rear portion of the display panel 31. In other words, the casing 21 encloses the periphery of the display panel 31. Further, the casing 21 has an exposure portion for exposing the display panel 31.

As shown in FIGS. 2 and 3, the display unit 12 further comprises a light guiding member 22 attached to the first masking member 35 so that a part of the light guising member 22 is located in the opening 37, and a second masking member 23 (masking member) covering the part of the light guising member 22. The second masking member 23 is in a disk shape and overlaps with the center portion of the light guiding member 22.

The light guiding member 22 (illumination ring component) has a predetermined thickness and is formed like a disk as a whole. The light guiding member 22 is formed of, for example, a resin material, which is, for example, a semi-transparent and which has, for example, milk-white color. Alternatively, the light guiding member 22 may be transparent. Yet alternatively, the light guiding member 22 may not have milk-white color, but be formed of a transparent matrix. Further, a base portion of the light guiding member 22 may be formed of a transparent matrix mixed with a large number of light reflecting/diffusing fine particles.

The light guiding member 22 comprises a disk-shaped portion 42, an annular projection 43 projecting from the disk-shaped portion 42, and a coating 44 coating the top surface of the projection 43. The disk-shaped portion 42 and the projection 43 are formed integral as one body. The projection 43 is provided on the peripheral portion of the disk-shaped portion 42. However, the annular portion of the projection 43 may be partially disconnected.

The coating 44 is formed like a so-called half mirror. The coating 44 transmits therethrough part of the light emitted from the interior of the light guiding member 22 (or from the light source) to the coating, and reflects and returns the other part of the light to the interior of the light guiding member 22. The coating 44 is a metallic thin film formed of, for example, aluminum. The metal used as the material of the coating 44 is not limited to aluminum, but may be nickel chrome, tin, and the like. The coating 44 is stuck to the projection using, for example, a hot stamp.

As shown in FIG. 3, the distance between the light guiding member 22 and the top surface of the light source 24 is set to an extremely small size, such as 1 mm to 2 mm. This realizes thinning of the video display device 11 and the casing 21, and reduction of the required space in the casing 21.

Figure 4:
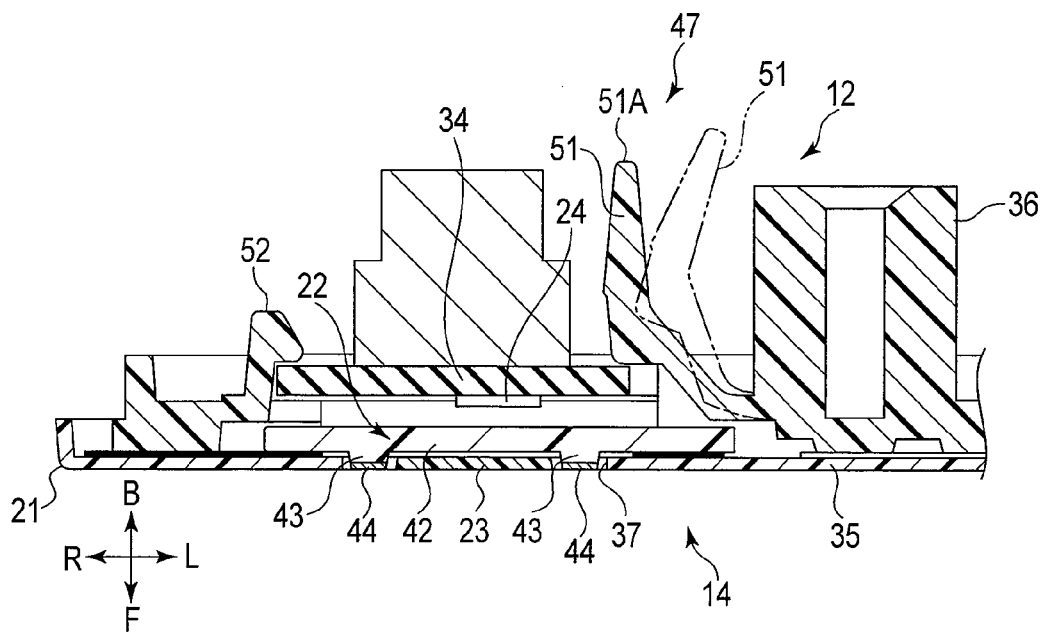
FIG. 4 is an exemplary cross sectional taking along line F4-F4 of FIG. 3.

As shown in FIGS. 3 and 4, the support member 36 comprises a first wall portion 45, a second wall portion 46, and a holding structure 47 for holding and fixing the light source plate 34. The first wall portions 45 and 46 reinforce the first masking member 35, and also hold the light source plate 34 therebetween. The first wall portion 45 is provided near the center of the light guiding member 22. The second wall portion 46 is provided near the outer peripheral portion of the light guiding member 22. Further, the distance P between the center of the light source 24 and the first wall portion 45 is set larger than the distance Q between the center of the light source 24 and the first wall portion 46. In other words, the support member 36 includes the first and second wall portions 45 and 46 that support the light source plate 34, and the distance between the first wall portion 45 and the light source 24 is set greater than the distance between the second wall portion 46 and the light source 24.

As shown in FIG. 4, the holding structure 47 comprises a flexible first engagement portion 51 (first claw portion) with a finger engaging portion 51A, and a second engagement portion 52 (second claw portion) opposing the first engagement portion 51. The light source plate 34 is provided between the first engagement portion 51 and the second engagement portion 52, and is fixed in position when it is engaged between the first and second engagement portions 51 and 52. As indicated by the two-dot chain line in FIG. 4, the light source plate 34 can be easily attached to and detached from the support member 36 by pressing and rotating, using a finger, the finger engaging portion 51A of the first engagement portion 51. Thus, no screw for fixing the light source plate 34 is necessary.

As shown in FIGS. 2 and 3, the second masking member 23 is a disk-shaped member having a predetermined thickness and covering the central portion of the light guiding member 22. The second masking member 23 is formed of a general resin material and has no light transmission property.

As shown in FIG. 2, the light source 24 is located within the casing 21 and overlaps with the projection 43. More specifically, the light source 24 is provided at a position 54 opposite to a position 53 that is close to the display panel 31, such that it overlaps with the projection 43. In other words, the light source 24 is provided at the position remotest from the display panel 31 among the positions overlapping with the projection 43. Further, the light source 24 is held between the first and second wall portions 45 and 46 via the light source plate 34.

The light source 24 is formed of a general upper-surface emission type LED. The light source 24 can emit light mainly in a direction perpendicular to the surface of the mounted light source plate 34, and a direction oblique to the direction perpendicular to the surface of the mounted light source plate 34. The light source 24 supplies light to the light guiding member 22, and emits light to the outside via the projection 43 (lights up through the projection 43).

Figure 5:
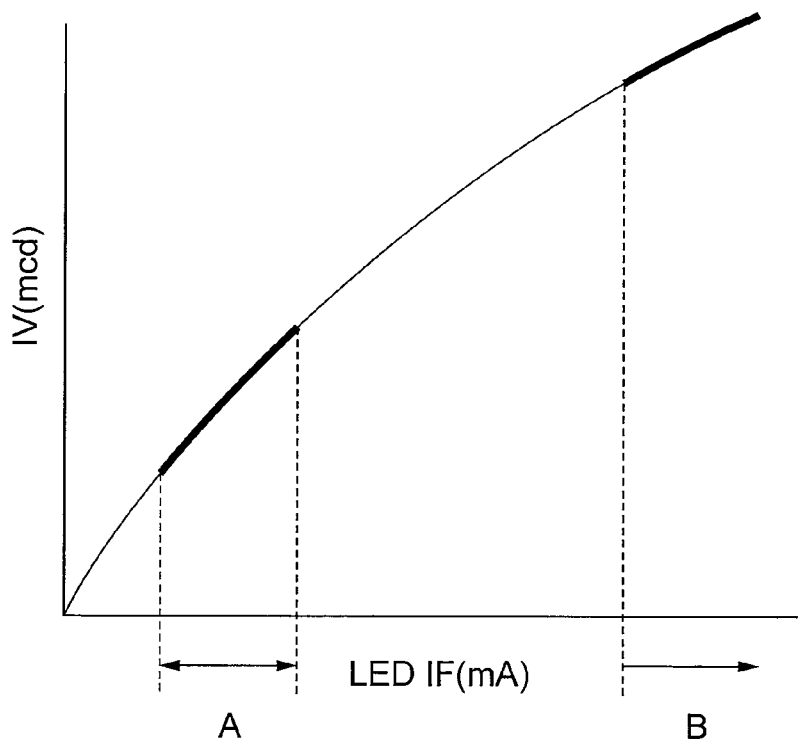
FIG. 5 is an exemplary graph illustrating the IV-IF characteristic of an LED as a light source incorporated in the video display device of FIG. 1.

FIG. 5 is a graph illustrating the IV-IF characteristic of the light source 24 (LED). As is understood from FIG. 5, the luminous intensity (IV) of the light source 24 (LED) increases in accordance with an increase in forwardly flowing current (IF). When supplying a current to the light source 24, the power supply circuit board 25 (power supply unit) can assume first to third modes. In the second mode, the power supply circuit board 25 supplies a current falling within a range A. In the first mode, it supplies a current falling within a range B. In the third mode, it supplies a current falling between the ranges A and B.

In the first mode, a relatively large amount of current flows through the light source 24. In other words, a predetermined amount of current flows through the light source 24, whereby a large amount of light is emitted to the light guiding member 22. As a result, a large amount of light passes through the coating 44 to irradiate the entire projection 43 of the light guiding member 22 (i.e., to irradiate the projection in the form of a ring).

In the second mode, a smaller amount of current than in the first mode flows, thereby reducing the amount of light emitted to the light guiding member 22. As a result, the amount of light passing through the coating 44 is also reduced to thereby irradiate only a part of the projection 43 of the light guiding member 22 (i.e., the reduced amount of light is concentrated on the part of the projection). Namely, in the second mode, as shown in FIG. 3, the portion C of the projection 43 opposing the light source 24 is mainly lit up.

Actually, the first and second modes are switched as described below. For instance, immediately after the power supply of the video display unit 11 is turned on, the power supply circuit board 25 lights up the light source 24 in the first mode to irradiate the entire projection 43. With lapse of time, the current supplied to the light source 24 is weakened gradually or stepwise to shift the first mode to the second mode. This prevents the visibility of the display panel 31 from reduction due to long-time lighting of the projection 43 in the first mode, and also realizes power saving.

This way of switching just an example, and may be modified such that the mode is switched from the second mode to the first mode. Further, the shift of from the first mode to the second mode, or the shift of from the second mode to the first mode, may be performed in a short time. The shift of modes in a short time is performed, for example, immediately after channel change is performed. More specifically, the mode is shifted from the second mode to the first mode in a short time, and thereafter, the first mode is shifted to the second mode gradually.

In the embodiment, the video display device 11 comprises the planar display panel 31, the casing 21 enclosing the periphery of the display panel 31 and having the opening 37, the plate-like light guiding member 22 having a part thereof located in the opening 37, the masking member overlapping with the light guiding member 22 to partially cover the light guiding member 22, the projection 43 included in the light guiding member 22 and located around the masking member, the light source 24 provided in the casing 21 for supplying light to the light guiding member 22 and emitting light from the projection 43 to the outside, and the power supply unit capable of switching the mode between the first mode in which a preset amount of current is supplied to the light source 24 to irradiate the entire projection 43, and the second mode in which a smaller amount of current than in the first mode is supplied to the light source 24 to irradiate a part of the projection 43.

By virtue of this structure, the display mode of the projection 43 can be changed between the first mode and the second mode simply by adjusting the amount of current. Thus, the simple structure enables the video display device 11 to exhibit two different illumination effects. Further, since the light guiding member 22 is formed like a plate, the central portion of the member 22 can be used to transmit light, and therefore can exhibit higher light guiding performance than a ring-shaped light guiding member. As a result, in the first mode, the light source can irradiate even a position of the light guiding member which is far from the light source.

The light source 24 is provided at a position which overlaps with the projection 43 and is opposite to a position close to the display panel 31. This structure prevents the light of the light source 24 from interfering with display on the display panel 31, and provides a desired illumination effect with visibility of the display panel 31 secured.

Further, the coating 44 is provided on the projection 43 for passing therethrough part of the light reaching the projection 43, and reflecting the other part of the light. By virtue of this structure, the difference in visual effects between the first and second modes is further emphasized. Namely, in the first mode, since sufficient light is supplied to the entire projection 43, the entire projection 43 is brightly irradiated with almost no influence of the coating 44. In contrast, in the second mode, sufficient light reaching a part of the projection 43 is passed through the coating 44 to thereby irradiate the portion of the projection 43, while weak light reaching the other portion of the projection 43 is blocked by the coating 44.

In addition, the video display apparatus 11 comprises the first wall portion 45 provided near the center portion of the light guiding member 22, the second wall portion 46 provided near the outer peripheral portion of the light guiding member 22, and the substrate held between the first and second wall portions 45 and 46 and mounted with the light source 24. The distance between the light source 24 and the first wall portion 45 is set greater than that between the light source 24 and the second wall portion 46.

In this structure, since the light source 24 is provided closer to the second wall portion 46 and away from the first wall portion 45, the light emitted from the light source 24 is prevented from being blocked by the first wall portion 45. Namely, if the light source 24 is located close to the first wall portion 45, the light emitted therefrom will be blocked by the first wall portion 45. By virtue of the above structure, sufficient light can be supplied to the projection 43, whereby the entire projection 43 can be brightly irradiated in the first mode.

Yet further, a part of the projection 43 opposes the light source 24, which enables the projection 43 to be irradiated in the second mode at a position remote from the display panel 31. As a result, a desired illumination effect can be obtained without adversely affecting the visibility of the display panel 31.

The video display apparatus 11 (electronic device) and the illumination unit 14 for use in the apparatus are not limited to the above-described embodiments, but may be modified in various ways in their implementation phase without departing from the scope of the invention.

More specifically, the light source 24 (LED) is not limited to an upper surface emission type, but may be, for example, an omnidirectional emission type LED. Also, the electrode stem of the light soured 24 (LED) may be appropriately angled so that it can emit light in both directions, i.e., in a direction crossing the width of the light guiding member 22, and in a direction along the length of the light guiding member 22. Yet further, although in the above-described embodiment, the second masking member 23 is provided, a thin switch member, or a sensor capable of sensing touch of a user finger, may be provided in place of the second masking member 23.

Various inventions can be realized by appropriately combining the structural elements disclosed in the embodiment. For instance, some of the disclosed structural elements may be deleted.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic device comprising:
   a display panel;
   a casing enclosing the display panel and comprising an opening;
   a plate-like light guide;
   a masking member configured to overlap with the light guide to cover a part of the light guide;
   a projection in the light guide and projecting around the masking member;
   a light source in the casing configured to supply light to the light guide and emit the light to an outside of the projection; and
   a power supply connected to the light source and configured to be switched between a first mode and a second mode, wherein the first mode comprises a first amount of current sufficient to irradiate an entire portion of the projection, and wherein the second mode comprises a smaller amount of current than in the first mode sufficient to irradiate a part of the projection.

2. The electronic device of claim 1, wherein the light source is at a position which overlaps with the projection and is opposite to a position close to the display panel.

3. The electronic device of claim 2, wherein the projection is coated with a film configured to pass through part of light reaching the projection, and to reflect other part of the light reaching the projection.

4. The electronic device of claim 3, further comprising:
   a first wall portion close to a central portion of the light guide;
   a second wall portion close to an outer peripheral portion of the light guide; and
   a substrate between the first and second wall portions and provided with the light source,
   wherein a distance between the first wall portion and the light source is greater than a distance between the second wall portion and the light source.

5. The electronic device of claim 4, wherein a part of the projection opposes the light source.

6. An electronic device comprising:
   a display panel;
   a casing enclosing the display panel and comprising an opening;
   a plate-like light guide;
   a projection in the light guide;
   a light source in the casing configured to supply light to the light guide;
   a first wall portion close to a central portion of the light guide; and a second wall portion close to an outer peripheral portion of the light guide, wherein the light source is between the first and second wall portions, and a distance between the first wall portion and the light source is greater than a distance between the second wall portion and the light source.

7. An illumination device comprising:

a casing comprising an opening;

a plate-like light guide;

a masking member configured to overlap with the light guide to cover a part of the light guide;

a projection in the light guide and projecting around the masking member;

a light source in the casing configured to supply light to the light guide and emit the light to an outside of the projection; and a power supply connected to the light source and configured to be switched between a first mode and a second mode, wherein the first mode comprises a first amount of current sufficient to irradiate an entire portion of the projection, and where in the second mode comprises a smaller amount of current than in the first mode sufficient to irradiate a part of the projection.

\* \* \* \* \*